H. H. JOHNSTON.
MOTOR CONTROL SYSTEM.
APPLICATION FILED JAN. 14, 1921.
1,433,726.
Patented Oct. 31, 1922.
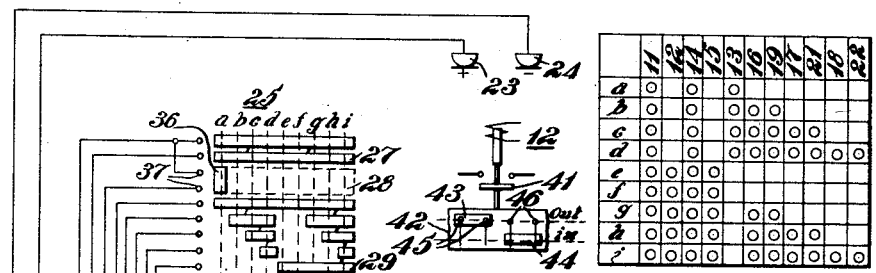
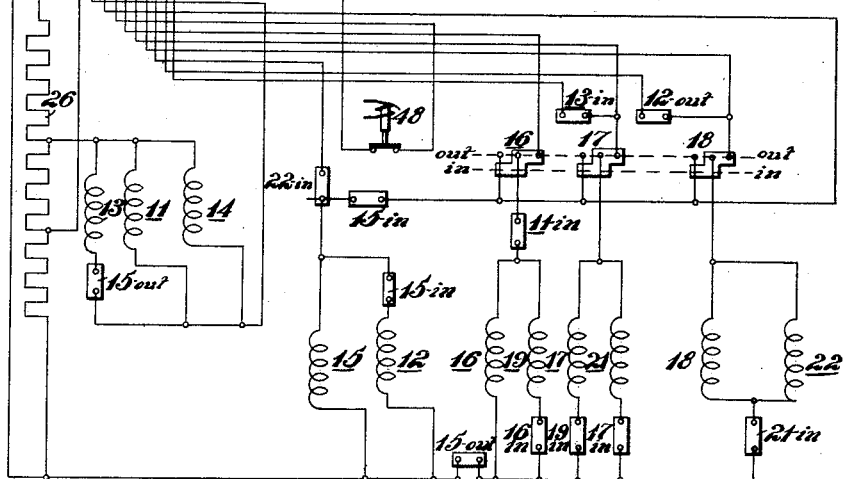
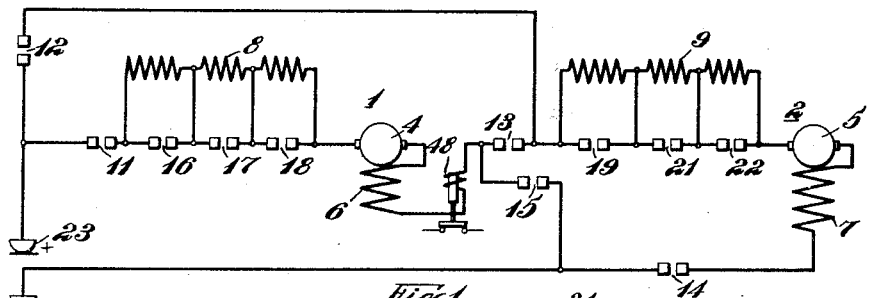
WITNESSES:
INVENTOR
Howard H. Johnston
BY
Wesley G. Carr
ATTORNEY Patented Oct. 31, 1922.

1,433,726

UNITED STATES PATENT OFFICE.

HOWARD H. JOHNSTON, OF EDGEWOOD, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed January 14, 1921. Serial No. 437,155.

*To all whom it may concern:*

Be it known that I, HOWARD H. JOHNSTON, a citizen of the United States, and a resident of Edgewood, in the county of Allegheny and State of Pennsylvania, have invented a new and useful Improvement in Motor-Control Systems, of which the following is a specification.

My invention relates to motor-control systems and it has particular relation to control systems for governing the motors of industrial locomotives that are employed for quencher purposes about coke ovens and iron and steel works.

The operators of industrial locomotives usually belong to a class having less skill than locomotive engineers who are employed by electric railway companies and are inclined to be careless in their operation of locomotives. It becomes highly desirable, therefore, to provide a control system for locomotives of this type which will make the motors responsive to the will of the operator but which will be so designed as not to be injured through careless or ignorant operation.

The object of my invention is to provide a control system which will permit of notch-by-notch acceleration of the motors in accordance with the purpose of the operator, but which will ensure automatic acceleration upon the operator actuating the controller too rapidly.

For a better understanding of my invention, reference should be made to the accompanying drawing, Figure 1 of which is a schematic view, showing a plurality of motors and main circuits for operating a quencher locomotive to be governed by a control system designed in accordance with my invention;

Fig. 2 is a schematic view of an auxiliary control system which operates a plurality of switches shown in Fig. 1;

Fig. 3 is a sequence chart, of well-known form, indicating the order of closing of contactors shown in Fig. 1;

Figs. 4 and 5 are views in plan and in end elevation, respectively, of apparatus employed in the master controller shown in Fig. 2;

Fig. 6 is a detail diagrammatic view of a switch or contactor that is shown in Figs. 1 and 2.

Referring particularly to Fig. 1, a plurality of motors 1 and 2 are employed to operate a quencher locomotive (not shown). The motors 1 and 2 respectively have armatures 4 and 5 and series field-magnet windings 6 and 7. Suitable starting resistors 8 and 9 are provided for the motors 1 and 2, respectively. Line switches 11 and 12, a series contactor 13 and ground contactors 14 and 15 are provided for effecting series-parallel operation of the motors 1 and 2.

Accelerating contactors 16, 17 and 18 are provided for shunting portions of the starting resistor 8, and accelerating contactors 19, 21 and 22 are provided for shunting portions of the starting resistor 9. The motors 1 and 2 are energized from any suitable source of electrical energy through third-rail shoes 23 and 24.

Referring to Fig. 2, a master controller 25, having a plurality of positions *a* to *i*, inclusive, governs the operation of the series-parallel contactors 11 to 15, inclusive, and the accelerating contactors 16 to 19, inclusive, and 21 and 22, by controlling the energization of the actuating coils thereof. Each of the contactors mentioned has its actuating coil energized in accordance with the difference in potential between certain portions of the control resistor 26. The control resistor 26 is connected directly across the line by having its terminals connected to third-rail shoes 23 and 24. The master controller 25 is provided with a plurality of contact segments 27, 28 and 29 of suitable contour.

The structure co-operating with the contact segment 28 is best shown in Figs. 4 and 5 and its operation in the control system is one of the principal features of my invention. This structure comprises an annular or ring member 31 having projecting portions or ears 32 in which suitable bolts 33 are positioned to regulate the amount of pressure of the ring member 31 upon a shaft 34 constituting a part of the master controller 25. The ring member 31 is preferably separated from the shaft 34 by a leather collar 35.

A contact block 36 is secured to the ring portion 31 to bridge a plurality of stationary contact members 37 when actuated into a certain position. A plurality of stationary studs 38 and a projection 39 of the ring member 31 serve to limit the circular movement of the contact member 28. If the master controller 25 is actuated in a forward direction, through one or more positions, the block 36, which is electrically connected to the contact segment 28, is brought into engagement with the stationary contact members 37.

Several of the main contactors of the control system are provided with auxiliary contacts or interlocks, which are shown, in a schematic form, in Fig. 2, for the sake of clearness and simplicity.

For a better understanding of the arrangement of interlocks on a contactor, reference is now made to Fig. 6, in which the line switch or contactor 12 is shown. The switch 12 comprises a main movable contact member 41 to which is secured a contact block 42 having contact segments 43 and 44 securely mounted thereon. When the contactor 41 is out, that is, in its lower position, an auxiliary circuit is established by the contact segment 43 and the contact terminal 45. When the contactor 41 is in, or closed, the contact segment 43 no longer bridges the contact terminals 45, thereby opening the auxiliary circuit. However, when the contactor 41 is raised to its upper position, the contact segment 44 bridges contact terminals 46.

The operation of the motors 1 and 2 is begun by actuating the master controller 25 to position $a$, thereby establishing a circuit from the contact shoe 23, through a portion of the control resistor 26, the parallel-connected actuating coils of contactors 11 and 14, contact segment 27 of the master controller 25 and a portion of control resistor 26, to contact shoe 24.

The actuating coil of the series contactor 13 is connected, in parallel relation, to the actuating coils of the contactors 11 and 14 but is interlocked with the auxiliary contact member or interlock that is secured to the ground contactor 15. This auxiliary contact member is in its closed position when the ground contactor 15 is open. This interlock prevents the contactors 13 and 15 from being closed simultaneously, which would establish a short circuit across the line.

When the master controller 25 is actuated to position $b$, a circuit is established from an intermediate point of control resistor 26 through contact members or current relay or limit switch 48, which has its actuating coil connected in series relation to the main circuits of the motors 1 and 2 (see Fig. 1), contact segment 29 of master controller 25, interlock 16-out and 11-in, actuating coil of contactor 16 and interlock 15-out to shoe 24.

After the contactor 16 has been closed thereby shunting a portion of the starting resistor 8, the actuating coil of the accelerating contactor 19 is connected in series relation with an interlock 16-in to effect the closure of the switch 19.

A holding circuit is established for each of the contactors 16 and 19 by a circuit from the shoe 23 through a portion of the control resistor 26, contact terminals 37, contact segment 36, which is mounted upon the oscillatable contact segment 28, interlock 16-in and 11-in and thence through parallel-connected actuating coils of the contactors 16 and 19, as previously traced.

When the master controller 25 is actuated to position $c$, a circuit is established from the contact members of current relay 48, through contact segment 29, interlock 17-out, the actuating coil of contactor 17 and interlocks 19-in and 15-out, to shoe 24.

As soon as the accelerating contactor 17 is closed, the actuating coil of the contactor 21 will be energized through the interlock 17-in. When contactors 17 and 21 close, additional portions of starting resistors 8 and 9, respectively, are shunted.

A holding circuit for contactors 17 and 21 are established, through contact segment 36 of movable contact segment 28 and interlock 17-out, in a manner similar to that described in connection with contactors 16 and 19.

The motors 1 and 2 may be further accelerated by actuating the master controller 25 to position $d$, thereby establishing a circuit from the contact members of the current relay 48 through segment 29 of master controller 25, interlock 18-out, parallel-connected actuating coils of the contactors 18 and 22 and interlocks 21-in and 15-out to shoe 24.

The contactors 18 and 22 will close simultaneously, thereby shunting the remaining portions of the starting resistors 8 and 9, respectively. The contactors 18 and 22 are maintained in their closed position by a holding-circuit through contact block 36 of the oscillatable contact segment 28 of master controller 25 and interlock 18-in, in a manner similar to that previously set forth.

The motors 1 and 2 are now connected to operate, in series relation, at their highest speed, as the starting resistors 8 and 9 have been completely shunted by the various accelerating contactors.

When the master controller had been actuated to position $e$, a circuit is established from the contact members of current relay 48, through contact segment 29 of master controller 25, interlock 22-in and actuating coil of ground contactor 15, to shoe 24.

When contactor 15 closes, interlock 15-in also closes, thereby energizing the actuating coil of line contactor 12, so that coil is connected in parallel relation to the actuating coil of contactor 15.

As soon as the contactor 15 assumes its closed position, a holding-circuit is established from control resistor 26, through contact strip 36 of oscillatable contact segment 28 and interlock 15-in, to the actuating coil of switch 15. The holding circuit for switch 12 is the same as that for the ground contactor 15, as it is connected in parallel relation therewith by interlock 15-in.

The accelerating contactors 16, 17, 18, 19, 21 and 22 will open when ground contactor 15 closes, as interlock 15-out, which is in series relation with the actuating coils of these contactors, will assume its open position. However, as soon as the switch 12 is closed, the interlock 12-in will close the portion of the circuit corresponding to that previously opened by the interlock 15-out. After the contactors 16, 17, 18, 19, 21 and 22 open, they will remain open until the master controller is actuated to position $g$.

In positions $e$ and $f$, the motors 1 and 2 undergo transition to parallel relation, the resistors 8 and 9 being connected in series relation with the motors 1 and 2, respectively.

When the master controller 25 is actuated to position $g$, a circuit will be established from the contact members of current relay 48, through contact segment 29 of master controller 25, interlocks 16-out and 11-in, actuating coil of contactor 16 and interlock 12-in, to shoe 24.

The contactor 19 will close as soon as the contactor 16 is closed, as the actuating coil thereof is connected in parallel relation with the actuating coil of contactor 16 by interlock 16-in, as has heretofore been described.

When the master controller 25 is actuated to positions $h$ and $i$, the pairs of accelerating contactors 17 and 21, and 18 and 22, respectively, will close, as will be noted by reference to the sequence chart shown in Fig. 3. The motors 1 and 2 being connected in parallel and the starting resistors 8 and 9 being completely shunted, the quencher locomotive will now be running at full speed.

By having the accelerating contactors 19, 17, 21, 18 and 22, consecutively interlocked, it is impossible for them to close in the wrong sequence. The control system is so designed that switch 12 cannot close until contactor 15 is closed, and it is impossible for the contactor 15 to close until all of the starting resistors 8 and 9 have been shunted, for the actuating coil of the contactor 15 is in series relation with the interlock 22-in of the accelerating contactor 22.

If the master controller 25 is actuated in a reverse direction to any one of the several positions, the contact block 36 of oscillatable contact segment 28 of master controller 25 will open, thereby breaking the holding-circuits for the actuating coils of accelerating contactors 16, 17, 18, 19, 21 and 22, ground switch 15 and line switch 12. However, the line switch 11 and the ground contactor 14 will remain closed and, as soon as the ground contactor 15 is opened, the series contactor 13 will close, thereby continuing to operate the motors 1 and 2, in series relation, at their lowest speed.

When the master controller 25 is notched forward one position, the contact block 36 of the oscillatable contact segments 28 will bridge contact terminals 37, thereby permitting certain of the contactors 12, 15, 16, 17, 18, 19, 21 and 22 to close, corresponding to the position occupied by the master controller 25.

The contactors will close automatically and in their usual sequence, regardless of the speed with which the master controller 25 is actuated.

For example, if the master controller is operated to position $g$, before any of the contactors have closed, the sequence of operation will remain the same as that shown in Fig. 3. It is apparent that, under such conditions, contactors 11, 13 and 14 will close, and the circuits, comprising the actuating coil of accelerating contactors 16 and 19, will be established in the usual manner.

The accelerating contactor 17 will be closed by a circuit established from the contact members of current relay 48, through contact segment 29, series contactor interlock 13-in, interlock 17-out, actuating coil of contactor 17 and interlocks 19-in and 15-out, to shoe 24. The accelerating contactor 21 will close after the contactor 17, as the actuating coils of contactors 17 and 21 are connected in parallel relation by interlock 17-in, as has heretofore been described.

Holding-circuits for the accelerating contactors 16, 17, 18, 19, 21 and 22, through contact block 36 of oscillatable contact segment 28, are the same as have been previously described.

After accelerating contactor 21 has closed, contactors 18 and 22 will be closed by a circuit from the contact members of current relay 48, through contact segment 29, interlocks 12-out and 18-out, parallel-connected actuating coils of contactors 18 and 22, and interlocks 21-in and 15-out, to shoe 24.

As soon as all the accelerating contactors 16, 17, 18, 19, 21 and 22 have closed, ground contactor 15 and line switch 12 will close, while the accelerating contactors and the series contactor 13 will open through the agency of circuits which have been previously described.

Only accelerating contactors 16 and 19 will close in position $g$, as circuits comprising the actuating coils of accelerating contactors 17 and 21 cannot be established, so long as interlock 13-in of series contactor 13 is open.

The accelerating contactors 18 and 22 will remain open in position $g$, their actuating coils being de-energized, since the circuits thereof will remain broken by the interlock 21-in.

If the master controller 25 is actuated rapidly through all its positions to position $i$, the contactors will close in the usual sequence that is indicated in Fig. 3.

When the master controller 25 has been actuated to position $i$, series contactors 12, 13 and 15 and accelerating contactors 16, 17, 18, 19, 21 and 22 will close in the same order, as in position $d$. The ground contactor 15 and the line switch 12 will close and the series contactor 13 will open after the accelerating contactors have closed. These operations will change the connections of the motors 1 and 2 from series to parallel relation.

The accelerating contactors 16, 17, 18, 19, 21 and 22 will close in the same predetermined order as heretofore. In position $i$, it is not necessary to employ the interlock 13-in of series contactor 13 and the interlock 12-out of line switch 12, as is done when the master controller 25 is actuated to position $g$ or to position $h$. The actuating coils of the accelerating contactors 17, 18, 21 and 22 are connected through the same portions of the contact segment 29 of the master controller 25 that they are when master controller 25 is in position $d$.

From the above description, it is apparent that I have provided a system of control for a plurality of motors whereby the sequence of operation of the contactors will always remain the same, regardless of the speed at which the master controller is actuated.

When the master controller is actuated in a reverse direction, all the contactors, with the exception of contactors 11, 13 and 14, will be opened, and the motors 1 and 2 will be connected in series relation with the resistors 8 and 9.

As soon as the master controller 25 is again actuated forward one position, all the contactors will assume positions corresponding to the position of the master controller 25.

By this system of control, the operator may operate the locomotive at whatever speed he may desire as is customary where a master controller is manually operable; but there is no danger of the operator impairing the control system by too rapidly actuating the master controller.

While I have shown my invention in a preferred form, it is apparent that minor modifications may be made in the arrangement of circuits and apparatus employed without departing from the spirit of my invention. I desire, therefore, to be limited only by the scope of the appended claims.

I claim as my invention:

1. In a motor-control system, the combination with a plurality of motors, of a master controller having a plurality of operative positions for governing said motors, means governed by said controller for connecting said motors in series and in parallel relation, means for automatically accelerating said motors by a predetermined sequence of operations in accordance with the position of said master controller, and means for rendering said accelerating means momentarily inoperative upon said controller being actuated in two directions.

2. In a motor-control system, the combination with a plurality of motors, of a master controller having a plurality of operative positions for governing said motors, means governed by said controller for connecting said motors in different relations, the one to the other, means for effecting substantially uniform acceleration, regardless of the rapidity with which said master controller is actuated, and means for repeating the acceleration of said motors to a degree corresponding to the position occupied by said controller when it is partially reversed and then actuated in a forward direction.

3. In a motor-control system, the combination with a plurality of motors, of a master controller having a plurality of operative positions for governing said motors, means governed by said controller for connecting said motors in different relations, the one to the other, means for effecting substantially uniform acceleration of said motors, regardless of the position of said master controller and the speed with which it is actuated, and means for rendering said accelerating means inoperative upon said controller being actuated in a reverse direction to any operative position without deenergizing said motors.

4. In a motor-control system, the combination with a plurality of motors, of a master controller having a plurality of operative positions for governing said motors, means governed by said controller for connecting said motors in series and in parallel relation, means, comprising said master controller, for effecting automatic acceleration of said motors by a predetermined sequence of operations corresponding to the position of said master controller, and means for reconnecting said motors in series relation upon said controller being actuated in a reverse direction from any position.

5. In a motor-control system, the combination with a plurality of motors, of means for connecting said motors in different relations one to another, means for accelerating said motors, and a master controller for operating said connecting means and said accelerating means, said means co-operating for producing automatic acceleration of said motors upon manual operation of said master controller to any position and, upon said master controller being actuated in a reversed direction and then in a forward direction, said motors are decelerated by said means in accordance with the number of positions to which said master controller has been reversed.

6. In a motor-control system, the combination with a plurality of motors, of a plurality of contactors for connecting said motors in different relations, means for varying the resistance in circuit with said motors, a master controller and a device controlled by said master controller, said master controller governing the operation of said contactors and of said means and said device co-operating with said master controller to maintain said contactors closed.

7. In a motor-control system, the combination with a plurality of motors, of a plurality of contactors for connecting said motors in different relations, said contactors having actuating coils, a plurality of resistors in circuit with said motors, a plurality of contactors for shunting said resistors, a master controller for controlling the operation of said connecting and said shunting contactors, and a device actuated by said master controller for maintaining the actuating coils of said contactors energized.

8. In a motor-control system, the combination with a plurality of motors having armatures, of a plurality of contactors for connecting said motors in series and in parallel relation, a plurality of resistors in series with said armatures, a plurality of contactors for shunting said resistors, a manually operable master controller having a plurality of positions and a contact device governed by said controller, said master controller and said device co-operating for producing automatic acceleration of said motor by closing said contactors in a predetermined sequence, the degree of acceleration corresponding to the position of said master controller.

9. In a motor-control system, the combination with a plurality of motors, of a plurality of contactors for connecting said motors in different relation and for accelerating said motors, said contactors having actuating coils, a master controller having a rotatable shaft for governing said contactors, a contact device mounted upon said shaft and maintained in frictional engagement therewith, said controller co-operating with said contactors for closing them in a predetermined sequence and said contact device maintaining holding circuits through the actuating coils of certain of said contactors as long as said master controller is actuated in a forward direction.

10. In a motor-control system, the combination with a plurality of motors, of a plurality of contactors for connecting said motors in different relation and for accelerating said motors, a master controller having a rotatable shaft for governing said contactors and a contact device mounted upon said shaft and maintained in frictional engagement therewith, said controller co-operating with said contactors for closing them in a predetermined sequence and said contact device maintaining a holding circuit for certain of said contactors as long as said master controller is actuated in a forward direction and opening certain of said contactors upon said master controller being actuated in a reverse direction.

11. In a motor-control system, the combination with a plurality of motors, of a plurality of contactors having actuating coils for connecting said motors in series and in parallel relation and for accelerating said motors, a master controller for governing said contactors and a contact device actuated by said controller, said controller and said contact device governing said contactors to effect uniform acceleration of said motors, the speed of said motors corresponding to the position of said master controller and upon said master controller being actuated in a reverse direction, said contact segment allowing a predetermined number of said contactors to open.

12. In a motor-control system, the combination with a plurality of motors, of a controller having a plurality of positions for governing said motors and means governed by said controller for connecting said motors in a manner corresponding to a predetermined operative position of said controller regardless of the operative position occupied by said controller after it has been reversed.

13. In a motor-control system, the combination with a plurality of motors, of a controller having a plurality of positions for governing said motors and means governed by said controller for connecting said motors in a manner corresponding to the first operative position of said controller regardless of the operative position occupied by said controller after it has been reversed.

In testimony whereof, I have hereunto subscribed my name this 5th day of January 1921.

HOWARD H. JOHNSTON.